United States Patent
Jang et al.

(10) Patent No.: US 11,312,255 B2
(45) Date of Patent: Apr. 26, 2022

(54) SYSTEM AND METHOD OF CONTROLLING LOW VOLTAGE DC-DC CONVERTER OF HYBRID VEHICLE

(71) Applicants: HYUNDAI MOTOR COMPANY, Seoul (KR); KIA MOTORS CORPORATION, Seoul (KR)

(72) Inventors: Young Jin Jang, Pohang-si (KR); Jeong Hye Choi, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 77 days.

(21) Appl. No.: 15/931,174

(22) Filed: May 13, 2020

(65) Prior Publication Data

US 2021/0354576 A1     Nov. 18, 2021

(51) Int. Cl.
*B60L 53/20* (2019.01)
*B60K 6/28* (2007.10)

(52) U.S. Cl.
CPC .............. *B60L 53/20* (2019.02); *B60K 6/28* (2013.01); *B60L 2210/10* (2013.01); *B60Y 2200/92* (2013.01)

(58) Field of Classification Search
CPC .......... B60L 53/20; B60L 2210/10–14; B60L 58/10–13; B60K 6/28; B60Y 2200/92
USPC .................................................. 307/10.1, 9.1
See application file for complete search history.

(56) References Cited

U.S. PATENT DOCUMENTS

| 2017/0113567 | A1* | 4/2017 | Koketsu | B60L 15/007 |
| 2017/0166081 | A1* | 6/2017 | Kwon | H01M 8/04567 |
| 2017/0274785 | A1* | 9/2017 | Kuribara | B60L 58/12 |

(Continued)

FOREIGN PATENT DOCUMENTS

| JP | 2006-149127 A | 6/2006 |
| JP | 2015-209100 A | 11/2015 |
| KR | 10-2008-0111194 A | 12/2008 |

(Continued)

OTHER PUBLICATIONS

Korean Office Action dated Aug. 10, 2021, issued in corresponding Korean Patent Application No. 10-2018-0160157.

(Continued)

*Primary Examiner* — Rexford N Barnie
*Assistant Examiner* — Swarna N Chowdhuri
(74) *Attorney, Agent, or Firm* — Morgan, Lewis & Bockius LLP

(57) ABSTRACT

A method of controlling a low voltage DC-DC converter of a hybrid vehicle includes determining whether cold cranking of the hybrid vehicle occurs based on a size and a rate of change of a detection value obtained by detecting a voltage of the auxiliary battery, a first adjusting operation of setting an output voltage command of the low voltage DC-DC converter to substantially the same value as the detection value and adjusting an output voltage of the low voltage DC-DC converter when determining that cold cranking occurs in the determining, and a second adjusting operation of adjusting the output voltage command and adjusting an output voltage of the low voltage DC-DC converter based on whether the detection value is increased or reduced and a comparison result between the detection value and a size of the output voltage command.

9 Claims, 3 Drawing Sheets

(56) References Cited

U.S. PATENT DOCUMENTS

2018/0056807 A1* 3/2018 Park .................. B60W 20/15

FOREIGN PATENT DOCUMENTS

| KR | 10-2013-0003978 A | 1/2013 |
|---|---|---|
| KR | 10-1438330 A | 9/2014 |
| KR | 10-2016-0107052 A | 9/2016 |
| KR | 10-1794857 A | 12/2017 |
| KR | 10-2018-0022127 A | 3/2018 |

OTHER PUBLICATIONS

Korean Notice of Allowance dated Dec. 1, 2021, issued in corresponding Korean Patent Application No. 10-2018-0160157.
Korean Office Action dated Jun. 16, 2020 issued in Korean Patent Application No. 10-2018-0160157.

* cited by examiner

SYSTEM AND METHOD OF CONTROLLING LOW VOLTAGE DC-DC CONVERTER OF HYBRID VEHICLE

TECHNICAL FIELD

The present disclosure relates to a system and method of controlling a low voltage DC-DC converter of a hybrid vehicle, and more particularly, to a system and method of controlling a low voltage DC-DC converter of a hybrid vehicle for controlling output of the low voltage DC-DC converter to stably manage the hybrid vehicle during cold cranking of the hybrid vehicle.

BACKGROUND

A hybrid vehicle has an engine and an electric motor as a power source of the vehicle and includes a high-voltage main battery for providing electric power to the electric motor and an auxiliary battery for providing electric power of an electric load of the vehicle. A low voltage DC-DC converter (LDC) for converting high-voltage power output from the main battery into a low voltage and providing the low voltage as charging power of the auxiliary battery or providing the low voltage as electric power of the electric load is provided between the main battery and the auxiliary battery.

A hybrid vehicle includes an engine, and thus, a cold cranking phenomenon whereby sudden voltage drop of an auxiliary battery occurs due to an operation of a starter motor at a time of engine cranking. As the starter motor consumes a large amount of power of the auxiliary battery for a short time at a time of engine cranking, the cold cranking phenomenon whereby sudden voltage drop of the auxiliary battery occurs, and in this case, when an LDC performs general output voltage control, there is a problem in that overcurrent is supplied to the auxiliary battery from the LDC while a voltage of the auxiliary battery is suddenly dropped.

In addition, when a difference between an output voltage of the auxiliary battery and a voltage of the LDC occurs during cold cranking, there is a problem in that a dimming phenomenon whereby the brightness of a headlight of a vehicle is unstably varied occurs.

The contents described here are only to assist in understanding the background of the present disclosure and should not be considered as corresponding to the related art known to those having ordinary skill in the art.

SUMMARY

Therefore, the present disclosure has been made in view of the above problems, and it is an object of the present disclosure to provide a system and method of controlling a low voltage DC-DC converter of a hybrid vehicle for controlling output of the low voltage DC-DC converter to stably manage the hybrid vehicle during cold cranking of the hybrid vehicle.

In accordance with an aspect of the present disclosure, the above and other objects can be accomplished by a system for controlling a DC-DC converter of a hybrid vehicle, including a main battery, a DC-DC converter configured to down-convert and output a voltage of the main battery, an auxiliary battery connected to an output end of the DC-DC converter, a voltage sensor configured to detect a voltage of the auxiliary battery, and a controller configured to determine whether cold cranking of the hybrid vehicle occurs based on a detection value of the voltage of the auxiliary battery, detected by the voltage sensor, and to adjust the DC-DC converter based on the detection value when cold cranking of the hybrid vehicle occurs.

According to an embodiment of the present disclosure, when the detection value is reduced at a greater rate than a preset reference rate of change and the detection value is maintained with a preset reference voltage or less for a preset reference time or greater, the controller may determine that cold cranking occurs.

According to an embodiment of the present disclosure, when determining that cold cranking occurs, the controller may be configured to adjust an output voltage of the DC-DC converter by setting an output voltage command of the DC-DC converter to substantially the same value as the detection value and may adjust an output voltage of the DC-DC converter.

According to an embodiment of the present disclosure, when determining that cold cranking occurs, the controller may be configured to increase an output voltage command of the DC-DC converter in a preset first rate of change when the output voltage command is less than or equal to the detection value in a state in which the detection value is increased, and may be configured to increase the output voltage command in a preset second rate of change having a smaller value than the first rate of change when the output voltage command of the DC-DC converter is greater than the detection value in a state in which the detection value is increased.

According to an embodiment of the present disclosure, when determining that cold cranking occurs, the controller may be configured to derate the DC-DC converter when the DC-DC converter outputs larger overcurrent than a preset reference value in a state in which the detection value is reduced.

According to an embodiment of the present disclosure, when determining that cold cranking occurs, the controller may be configured to maintain the output voltage command when the DC-DC converter does not output larger overcurrent than a preset reference value in a state in which the detection value is reduced.

According to an embodiment of the present disclosure, the DC-DC converter may be a low voltage DC-DC converter.

In accordance with another aspect of the present disclosure, the above and other objects can be accomplished by a method of controlling a DC-DC converter of a hybrid vehicle including the DC-DC converter configured to down-convert a voltage of a main battery and to output the voltage to an auxiliary battery and an electric load, including determining whether cold cranking of the hybrid vehicle occurs based on a detection value and a rate of change of the detection value obtained by detecting a voltage of the auxiliary battery, a first adjusting operation of setting an output voltage command of the DC-DC converter to substantially the same value as the detection value and adjusting an output voltage of the DC-DC converter when determining that cold cranking occurs in the determining, and a second adjusting operation of adjusting the output voltage command to adjust an output voltage of the DC-DC converter based on whether the detection value is increased or reduced and a comparison result between the detection value and a value of the output voltage command.

According to an embodiment of the present disclosure, the determining may include determining that cold cranking occurs when the detection value is reduced at a greater rate than a preset reference rate of change and the detection value is maintained with a preset reference voltage or less for a preset reference time or greater.

According to an embodiment of the present disclosure, the first adjusting operation may include increasing an output voltage command of the DC-DC converter in a preset first rate of change when the output voltage command is less than or equal to the detection value in a state in which the detection value is increased, and increasing the output voltage command in a preset second rate of change having a smaller value than the first rate of change when the output voltage command of the DC-DC converter is greater than the detection value in a state in which the detection value is increased.

According to an embodiment of the present disclosure, the second adjusting operation may include derating the DC-DC converter when the DC-DC converter outputs larger overcurrent than a preset reference value in a state in which the detection value is reduced.

According to an embodiment of the present disclosure, the second adjusting operation may include maintaining the output voltage command when the DC-DC converter does not output larger overcurrent than a preset reference value in a state in which the detection value is reduced.

According to an embodiment of the present disclosure, the DC-DC converter may be a low voltage DC-DC converter.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Hereinafter, a system and method of controlling a low-voltage DC-DC converter of a hybrid vehicle according to exemplary embodiments of the present disclosure will be described in more detail with reference to the accompanying drawings.

Figure 1:
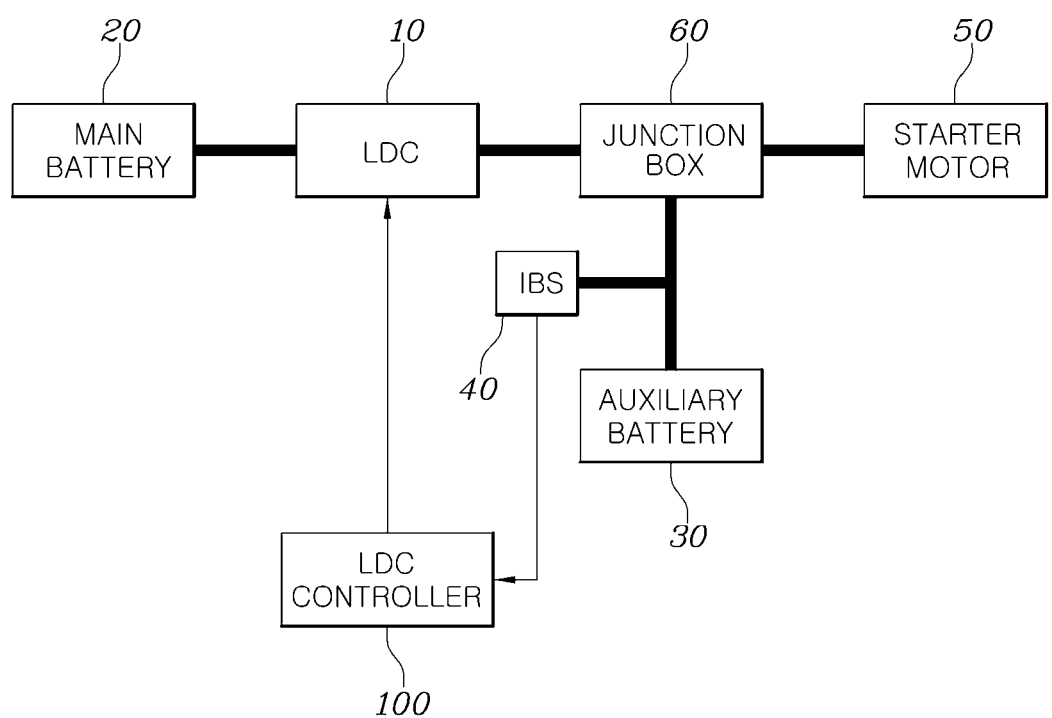
FIG. 1 is a block diagram showing a configuration of a low voltage DC-DC converter (LDC) control system of a hybrid vehicle according to an embodiment of the present disclosure.

FIG. 1 is a block diagram showing a configuration of a low voltage DC-DC converter control system of a hybrid vehicle according to an embodiment of the present disclosure.

Referring to FIG. 1, a low voltage DC-DC converter control system of a hybrid vehicle according to various embodiments of the present disclosure may include a main battery 20, a low voltage DC-DC converter (LDC) 10 for down-converting and outputting a voltage of the main battery 20, an auxiliary battery 30 connected to an output end of the LDC 10, a voltage sensor 40 for detecting a voltage of the auxiliary battery 30, and a controller 100 for determining whether cold cranking of the hybrid vehicle occurs based on a detection value of the voltage of the auxiliary battery 30, detected by the voltage sensor 40, and for adjusting output of the LDC 10 based on the detection value when cold cranking occurs.

The LDC 10 may be disposed between the main battery 20 and the auxiliary battery 30. The auxiliary battery 30 may be a battery outputting a relatively low voltage for providing electric power to various electric loads 50 applied to the vehicle, as compared to a voltage output from the main battery 20. The main battery 20 may be a battery outputting a relatively high voltage for providing power to a driving motor for driving the vehicle, as compared to a voltage output from the auxiliary battery 30. The LDC 10 may down-convert high-voltage power of the main battery 20 to output low-voltage power.

The LDC 10 may be connected to the auxiliary battery 30 and the electric load 50 including, but not limited to, a starter motor, at one node using a component such as a junction box 60. That is, an output voltage and output current of the LDC 10 may be provided as a charging voltage and charging current of the auxiliary battery 30 through the junction box 60 and may also be provided as electric power of the electric load 50. Power stored in the auxiliary battery 30 may also be provided to the electric load 50 through the junction box 60.

The voltage sensor 40 may be a component for generating a voltage detection value obtained by detecting a voltage of the auxiliary battery 30. Various known sensors may be employed as the voltage sensor 40. FIG. 1 shows an example in which an intelligent battery sensor (IBS) is applied as the voltage sensor.

The controller 100 may be a micro controller including a processor for executing a control algorithm for embodying various embodiments of the present disclosure and a memory implemented, for example, as a non-transitory computer readable medium for storing various pieces of information required to the control algorithm.

The controller 100 may generate an output voltage command for controlling an output voltage of the LDC 10, and may generate a pulse width modulation (PWM) signal for driving a switching device in the LDC 10 and may output the PWM signal to the LDC 10 in order to enable the LDC 10 to output a voltage corresponding to the output voltage command.

PWM control of the switching device of the LDC 10 may correspond to known technology of a field of a converter, and a PWM integrated circuit (IC) for generating the PWM signal may be present in the form of a commercialized product, and accordingly, a detailed description thereof is omitted.

In particular, various embodiments of the present disclosure relates to a scheme for dropping a voltage of the auxiliary battery 30 during engine cranking of the hybrid vehicle by the starter motor 50 as one of electric loads connected to the auxiliary battery 30 and adjusting an output voltage of the LDC 10, that is, the output voltage command of the LDC 10 when cold cranking whereby the sudden voltage drop is maintained for a relatively long time occurs. For engine cranking at a lower temperature, a longer time may be needed than engine cranking at a higher temperature. Thus, when cold cranking occurs and the starter motor 50 is operated, a time for which the auxiliary battery 30 is maintained with a lower voltage than a preset value may be lengthened. According to various embodiments of the present disclosure, when such cold cranking occurs, a safe vehicle state may be maintained by appropriately adjusting the output voltage command of the LDC 10.

An operation and effect of the low voltage DC-DC converter control system of the vehicle according to an embodiment of the present disclosure having the aforementioned configuration would be more clearly understood from a description of a method of controlling a low voltage DC-DC converter (LDC) according to an embodiment of the present disclosure.

Figure 2:
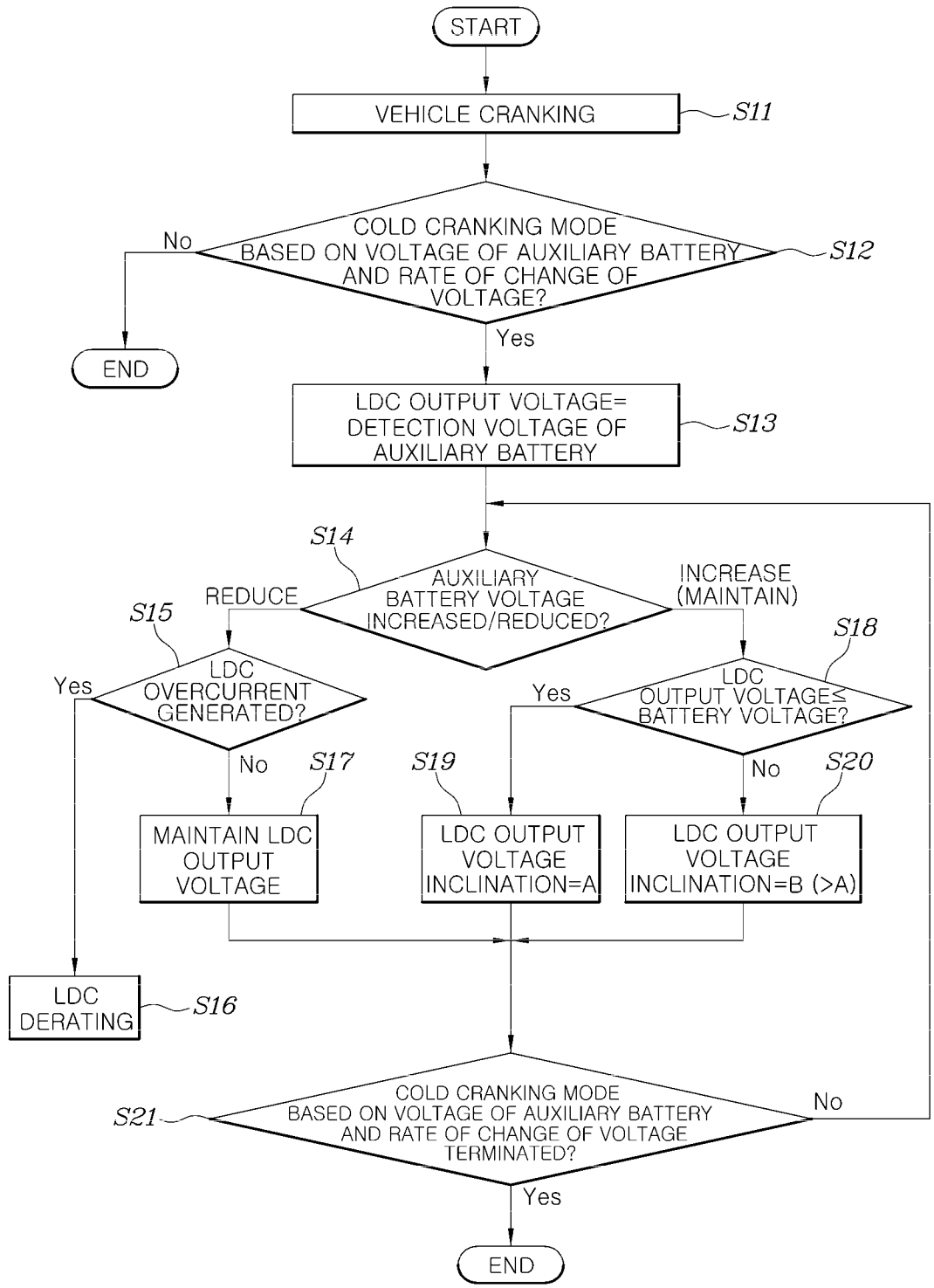
FIG. 2 is a flowchart showing a method of controlling an LDC of a hybrid vehicle according to an embodiment of the present disclosure.
Figure 3:
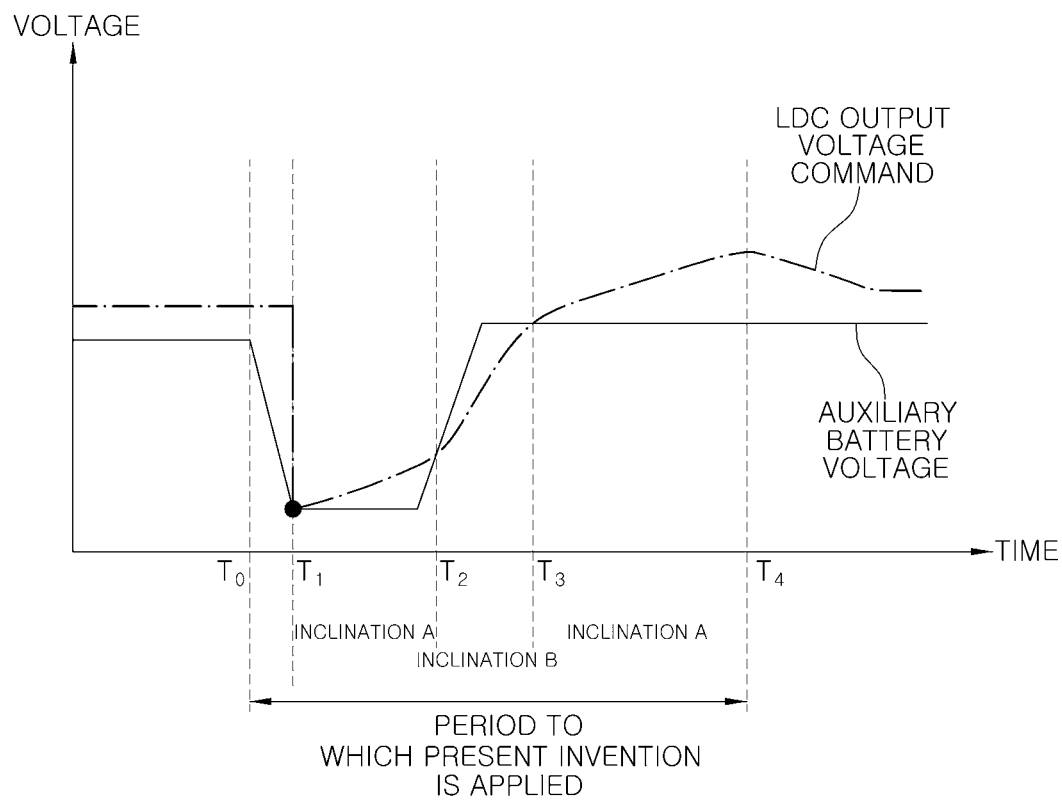
FIG. 3 is a graph showing an example of an output voltage command of an LDC, which is adjusted depending on a detected voltage of an auxiliary battery in a system and method of controlling an LDC of a hybrid vehicle according to an embodiment of the present disclosure.

FIG. 2 is a flowchart showing a method of controlling an LDC of a hybrid vehicle according to an embodiment of the present disclosure. FIG. 3 is a graph showing an example of an output voltage command of an LDC, which is adjusted depending on a detected voltage of an auxiliary battery in a system and method of controlling an LDC of a hybrid vehicle according to an embodiment of the present disclosure.

Referring to FIG. 2, in the method of controlling an LDC of a hybrid vehicle according to an embodiment of the present disclosure, when vehicle cranking begins (S11), the controller 100 may determine whether cold cranking occurs based on the size and rate of change of a detection value obtained by detecting a voltage of the auxiliary battery 30 by the voltage sensor 40 (S12).

In more detail, in operation S12, when the detection value of the voltage of the auxiliary battery 30, detected by the voltage sensor 40, is reduced at a greater rate than a preset reference rate of change and a detected voltage of the auxiliary battery 30 is maintained as a preset reference value or less for a preset reference time or greater, the controller 100 may determine that cold cranking occurs.

In operation S12, when determining that cold cranking occurs, the controller 100 may set the output voltage command of the LDC 10 to substantially the same value to the detection value of the voltage of the auxiliary battery 30, detected by the voltage sensor 40. As such, overcurrent may be prevented from being generated by suddenly applying a high voltage to the auxiliary battery 30 with a low voltage by the LDC 10 when cold cranking occurs, thereby protecting the auxiliary battery 30.

Referring to FIG. 3, the controller 100 may determine whether cold cranking occurs to a time $T_1$ from a time $T_0$ and may generate the output voltage command of the LDC 10, which is substantially the same as a voltage of the auxiliary battery 30, the time $T_1$.

Here, when the output voltage command is substantially the same as a voltage of the auxiliary battery, this does not mean that the output voltage command numerically corresponds exactly to the voltage of the auxiliary battery, but instead, means that the output voltage command is one value in a specific range around the voltage of the auxiliary battery, which is capable of achieving an equivalent effect to an effect to be achieved by generating the output voltage command as a value corresponding exactly to the voltage of the auxiliary battery. In one example, the specific range may be a preset range or a default range.

Then, in operation S12, after setting the output voltage command of the LDC 10 to the same value, or substantially the same value, as the detection value of the voltage of the auxiliary battery 30, detected by the voltage sensor 40, the controller 100 may check whether the detection value of the voltage of the auxiliary battery 30 is increased or lowered (S14).

When the detected voltage of the auxiliary battery 30 is lowered, although not shown, whether overcurrent is generated may be determined by a current sensor installed at an output end of the LDC 10 (S15), and when overcurrent is generated, output current of the LDC 10 may be reduced by derating an operation of the LDC 10 (S16), thereby protecting the auxiliary battery 30.

When the LDC 10 does not output overcurrent in operation S15, the output voltage command set in operation S13 may be maintained (S17).

When the detected voltage of the auxiliary battery is increased in operation S14, the controller 100 may compare the voltage command of the LDC 10 with the detected value of the voltage output from the voltage sensor 40 (S18).

As a comparison result of operation S18, when the output voltage command of the LDC 10 is less than or equal to the detected value of the voltage of the auxiliary battery 30, the output voltage command of the LDC 10 may be increased in a preset first rate of change "A" (S19).

As a comparison result of operation S18, when the output voltage command of the LDC 10 is greater than the detected value of the voltage of the auxiliary battery 30, the output voltage command may be increased in a preset second rate of change "B", which has a smaller value than the first rate of change "A" (S20). The output voltage command of operations S19 and S20 may be represented between times $T_1$ and $T_4$ of FIG. 3.

Here, the first rate of change "A" may be a rate of change of a small value less than 1 V per second, and the second rate of change "B" may be a rate of change of a significant great value of about 5 V per second.

That is, according to an embodiment of the present disclosure, the controller 100 may set a great rate of change the voltage command in order to rapidly supply power to the auxiliary battery 30 from the LDC 10 when the output voltage command of the LDC 10 is less than the detected value of the voltage of the auxiliary battery 30. When the output voltage command of the LDC 10 is greater than the detected value of the voltage of the auxiliary battery 30, a change in the output voltage command of the LDC 10 may be set to be low not to increase a difference from the voltage of the auxiliary battery 30 in order to prevent a dimming phenomenon of a headlight from occurring when a voltage applied to the headlight of the vehicle of the electric load 50 is suddenly changed.

Then, oppositely to the determination performed in operation S12, when the detected value of the voltage of the auxiliary battery 30, detected by the voltage sensor 40, is reduced to a smaller value than a preset reference rate of change and the detected voltage of the auxiliary battery 30 is maintained with a preset reference voltage or greater for a preset reference time or greater, the controller 100 may determine that cold cranking is terminated and may terminate control through the aforementioned operations S13 to S20 (S21).

Needless to say, the preset reference rate of change, preset reference time, and preset reference voltage applied to operation S21 may have different values from in operation S12 for determining termination of cold cranking.

As described above, according to various embodiments of the present disclosure, overcurrent may be prevented from occurring by stably controlling output of a low voltage DC-DC converter (LDC) even in a situation in which the voltage of the auxiliary battery is suddenly changed when cold cranking occurs and output of the LDC may also be adjusted while the output voltage command of the LDC is changed in consideration of variation in the voltage of the auxiliary battery when cold cranking occurs, and accordingly, power may be smoothly supplied to the auxiliary battery and a dimming phenomenon of a headlight of a vehicle may be prevented.

The system and method of controlling a low voltage DC-DC converter (LDC) of a hybrid vehicle may stably control output of the LDC even in a situation in which a voltage of an auxiliary battery is suddenly changed when cold cranking occurs, thereby preventing overcurrent from being generated.

In addition, the system and method of controlling an LDC of a hybrid vehicle may adjust output of the LDC while changing the output voltage command of the LDC in consideration of variation in battery voltage when cold cranking occurs, thereby preventing a dimming phenomenon of a headlight of a vehicle.

It will be appreciated by persons skilled in the art that the effects that could be achieved with the present disclosure are not limited to what has been particularly described hereinabove and other advantages of the present disclosure will be more clearly understood from the detailed description.

Although the exemplary embodiments of the present disclosure have been described above with reference to the accompanying drawings, those skilled in the art will appreciate that the present disclosure can be implemented in various other embodiments without changing the technical ideas or features thereof.

What is claimed is:

1. A system for controlling a DC-DC converter of a hybrid vehicle, comprising:
    a main battery;
    a DC-DC converter configured to down-convert and output a voltage of the main battery;
    an auxiliary battery connected to an output end of the DC-DC converter;
    a voltage sensor configured to detect a voltage of the auxiliary battery; and
    a controller configured to determine whether cold cranking of the hybrid vehicle occurs based on a detection value of the voltage of the auxiliary battery, detected by the voltage sensor, and to adjust the DC-DC converter based on the detection value when cold cranking of the hybrid vehicle occurs,
    wherein, when the detection value of the voltage of the auxiliary battery is reduced at a greater rate than a preset reference rate of change and the detection value of the voltage of the auxiliary battery is maintained with a preset reference voltage or less for a preset reference time or greater, the controller determines that cold cranking occurs;
    wherein, when determining that cold cranking occurs, the controller is configured to increase an output voltage command of the DC-DC converter in a preset first rate of change when the output voltage command is less than or equal to the detection value in a state in which the detection value is increased, and to increase the output voltage command in a preset second rate of change having a smaller value than the first rate of change when the output voltage command of the DC-DC converter is greater than the detection value in a state in which the detection value is increased.

2. The system of claim 1, wherein the controller is configured to, when determining that cold cranking occurs, adjust an output voltage of the DC-DC converter by setting an output voltage command of the DC-DC converter to the same value as the detection value.

3. The system of claim 1, wherein, when determining that cold cranking occurs, the controller is configured to derate the DC-DC converter when the DC-DC converter outputs larger overcurrent than a preset reference value in a state in which the detection value is reduced.

4. The system of claim 1, wherein, when determining that cold cranking occurs, the controller is configured to maintain the output voltage command when the DC-DC converter does not output larger overcurrent than a preset reference value in a state in which the detection value is reduced.

5. The system of claim 1, wherein the DC-DC converter is a low voltage DC-DC converter.

6. A method of controlling a DC-DC converter of a hybrid vehicle, the DC-DC converter configured to down-convert a voltage of a main battery and to output the voltage to an auxiliary battery and an electric load, the method comprising:
    determining whether cold cranking of the hybrid vehicle occurs based on a detection value and a rate of change of the detection value obtained by detecting a voltage of the auxiliary battery;
    a first adjusting operation of setting an output voltage command of the DC-DC converter to the same value as the detection value and adjusting an output voltage of the DC-DC converter when determining that cold cranking occurs; and
    a second adjusting operation of adjusting the output voltage command to adjust an output voltage of the DC-DC converter based on whether the detection value auxiliary is increased or reduced and a comparison result between the detection value of the voltage of and a value of the output voltage command,
    wherein the determining whether cold cranking of the hybrid vehicle occurs includes determining that cold cranking occurs when the detection value of the voltage of the auxiliary battery is reduced at a greater rate than a preset reference rate of change and the detection value of the voltage of the auxiliary battery is maintained with a preset reference voltage or less for a preset reference time or greater;
    wherein the first adjusting operation includes increasing an output voltage command of the DC-DC converter in a preset first rate of change when the output voltage command is less than or equal to the detection value in a state in which the detection value is increased, and increasing the output voltage command in a preset second rate of change having a smaller value than the first rate of change when the output voltage command of the DC-DC converter is greater than the detection value in a state in which the detection value is increased.

7. The method of claim 6, wherein the second adjusting operation includes derating the DC-DC converter when the DC-DC converter outputs larger overcurrent than a preset reference value in a state in which the detection value is reduced.

8. The method of claim 6, wherein the second adjusting operation includes maintaining the output voltage command when the DC-DC converter does not output larger overcurrent than a preset reference value in a state in which the detection value is reduced.

9. The method of claim 6, wherein the DC-DC converter is a low voltage DC-DC converter.

* * * * *